(12) United States Patent
Raj et al.

(10) Patent No.: US 9,396,059 B2
(45) Date of Patent: Jul. 19, 2016

(54) EXCHANGE ERROR INFORMATION FROM PLATFORM FIRMWARE TO OPERATING SYSTEM

(71) Applicant: INTEL CORPORATION, Santa Clara, CA (US)

(72) Inventors: Ashok Raj, Portland, OR (US); Mohan Kumar, Aloha, OR (US); Narayan Ranganathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 14/135,570

(22) Filed: Dec. 19, 2013

(65) Prior Publication Data
US 2015/0178142 A1    Jun. 25, 2015

(51) Int. Cl.
*G06F 11/00* (2006.01)
*G06F 11/07* (2006.01)
*G06F 11/30* (2006.01)

(52) U.S. Cl.
CPC ........ *G06F 11/0793* (2013.01); *G06F 11/0706* (2013.01); *G06F 11/0766* (2013.01); *G06F 11/0787* (2013.01); *G06F 11/30* (2013.01); *G06F 11/3003* (2013.01)

(58) Field of Classification Search
CPC . G06F 11/0766; G06F 11/0787; G06F 11/30; G06F 11/3003
See application file for complete search history.

(56) References Cited

U.S. PATENT DOCUMENTS

| 6,516,429 | B1 * | 2/2003 | Bossen et al. | 714/47.2 |
| 2003/0126516 | A1 * | 7/2003 | Komarla et al. | 714/45 |
| 2006/0161822 | A1 * | 7/2006 | Furuta | 714/52 |
| 2011/0138219 | A1 * | 6/2011 | Walton et al. | 714/3 |
| 2011/0154091 | A1 * | 6/2011 | Walton et al. | 714/2 |
| 2014/0207808 | A1 * | 7/2014 | Sabsevitz | 707/756 |

\* cited by examiner

*Primary Examiner* — Joshua P Lottich
(74) *Attorney, Agent, or Firm* — International IP Law Group, P.L.L.C.

(57) ABSTRACT

A computing system can include a platform firmware to monitor hardware errors and to notify an operating system when a corrective action is to be performed to address a hardware error. The computing system can also include an extended error log to describe a hardware error. The computing system can further include an action record to direct the operating system to perform the corrective action to address the hardware error.

19 Claims, 4 Drawing Sheets

300

400

EXCHANGE ERROR INFORMATION FROM PLATFORM FIRMWARE TO OPERATING SYSTEM

TECHNICAL FIELD

The present techniques relate generally to errors. In particular, the present techniques relate to exchanging error information between platform firmware and an operating system.

BACKGROUND

Computer hardware errors can occur when a central processing unit (CPU) detects a hardware problem. Examples of hardware errors include system bus errors, memory errors, and cache errors, among others. These hardware errors can be caused by overclocking, overheating of the hardware components, power supply issues, or problems with software, among others. Corrective action can be taken by an operating system to address some hardware errors.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION OF SPECIFIC EMBODIMENTS

An operating system (OS) can be used to track error rates and past events from different sensors within a platform in order to advise on field repair to an end user or administrator. However, in a horizontal market in which there are many system components from different vendors, it is very difficult to have failure rates published clearly. Moreover, what may be reported by an OS as needing to be addressed may be perfectly normal for the component, making it difficult for a generic operating system to adapt.

Embodiments disclosed herein describe techniques for exchanging error information between platform firmware and an operating system (OS) or virtual machine manager (VMM). Platform firmware on mission critical platforms can include advanced error logging and diagnostic support. Mission critical OS's have capabilities to monitor hardware events and perform diagnostics referred to as Predictive Failure Analysis (PFA) or self-healing architecture. In order to address the difficulty of unclear failure rates, the platform firmware can monitor error rates. The platform firmware can determine when the operating system is to perform a corrective action to address an error and direct the OS to perform the corrective action. By employing the platform firmware to monitor errors, only errors which are to be recorded and addressed by the OS are passed to the OS, reducing errors logged for system administrator in the computing system. By reducing these unnecessary logs, OEMs can avoid some expensive support calls, and even avoid unneeded repairs.

Figure 1:
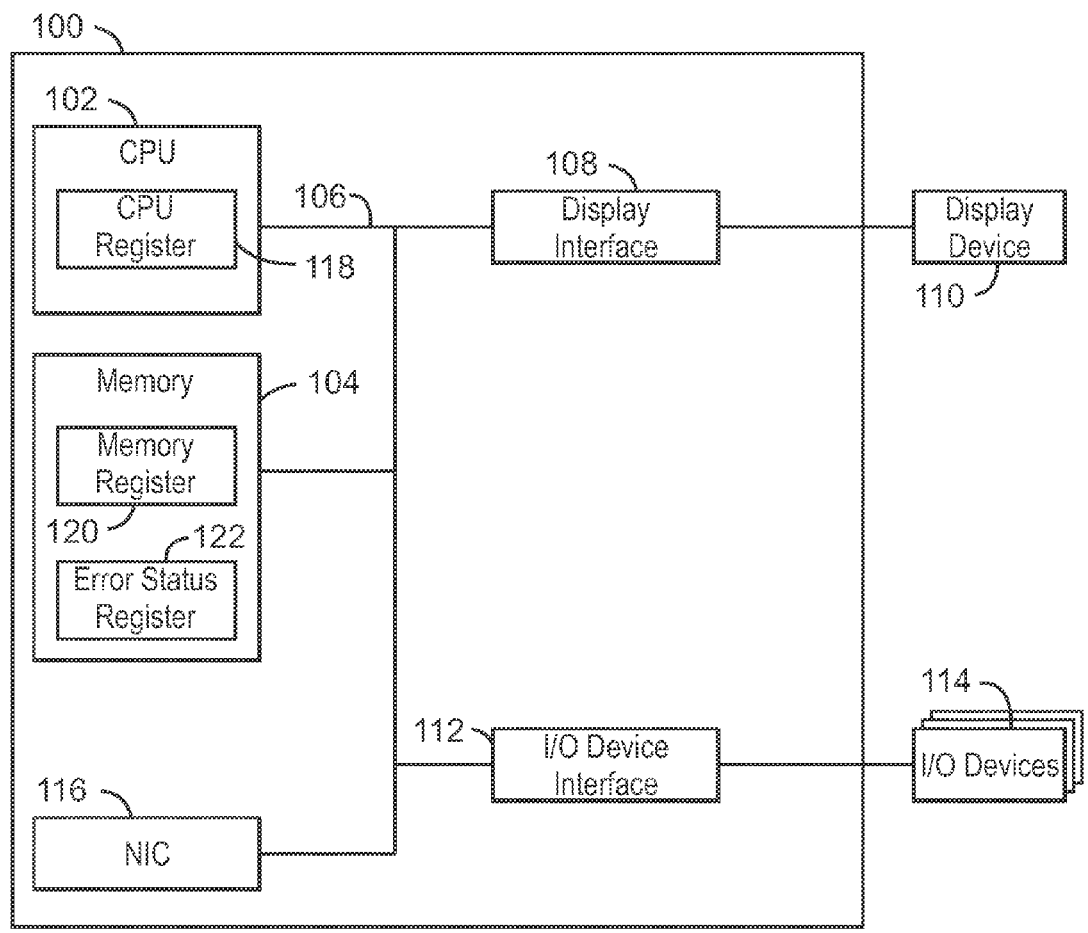
FIG. 1 is a block diagram of a computing system.

FIG. 1 is a block diagram of a computing system 100 for exchanging error information between platform firmware and an operating system. The computing system 100 may be any suitable type of computing system including, for example and without limitation, a desktop computer, tablet computer, laptop computer, a system on a chip (SoC), and the like. The computing system 100 can include a central processing unit (CPU) 102 to execute stored instructions, as well as a memory device 104 that stores instructions that are executable by the CPU 102. The CPU 102 can be coupled to the memory device 104 by some interconnect (for e.g. a bus 106). Additionally, the CPU 102 can be an SoC, single core processor, a multi-core processor, or any number of other configurations. Furthermore, the computing system 100 can include more than one CPU 102.

The memory device 104 can include random access memory (RAM), read only memory (ROM), flash memory, or any other suitable memory systems. For example, the memory device 104 can include dynamic random access memory (DRAM). The CPU 102 can be linked through the bus 106 to a display interface 108 to connect the computing system 100 to a display device 110. The display device 110 can include a display screen that is a built-in component of the computing system 100. The display device 110 can also include a computer monitor, television, or projector, among others, that is externally connected to the computing system 100. The CPU 102 can also be linked through the bus 106 to an I/O interface 112 to connect the computing system 100 to an I/O device(s) 118. The I/O devices 114 can be any type of I/O devices including, but not limited to, storage devices and printers.

A device like a network interface card (NIC) 116 can connect the computing system 100 through the system bus 106 to a network (not depicted). The network (not depicted) can be a wide area network (WAN), local area network (LAN), or the Internet, among others. In an example, the computing system 100 can connect to a network via a wired connection or a wireless connection.

The computing system 100 can include a plurality of hardware registers 118-120. The hardware registers can include a CPU register 118 and a memory register 120, as well as any other registers associated with the hardware components of the computing system 100. In some cases, the hardware registers 118-120 store error logs. The error logs contain information relating to an error experienced by the hardware components to which the hardware register 118-120 is associated.

The computing system 100 can also include an error status register 122. The error status register 122 is accessible by the platform firmware and the operating system. An extended error log including an action record can be stored in the error status register 122 by the platform firmware. The extended error log can include information about a hardware error. The action record can include a corrective action to be taken by the operating system to address the hardware error. Upon receiving a signal from the platform firmware, the operating system can access the extended error log to receive information on corrective action to take to address the hardware error.

It is to be understood the block diagram of FIG. 1 is not intended to indicate that the computing system 100 is to include all of the components shown in FIG. 1 in every case. Further, any number of additional components can be included within the computing system 100, depending on the details of the specific implementation.

Figure 2:
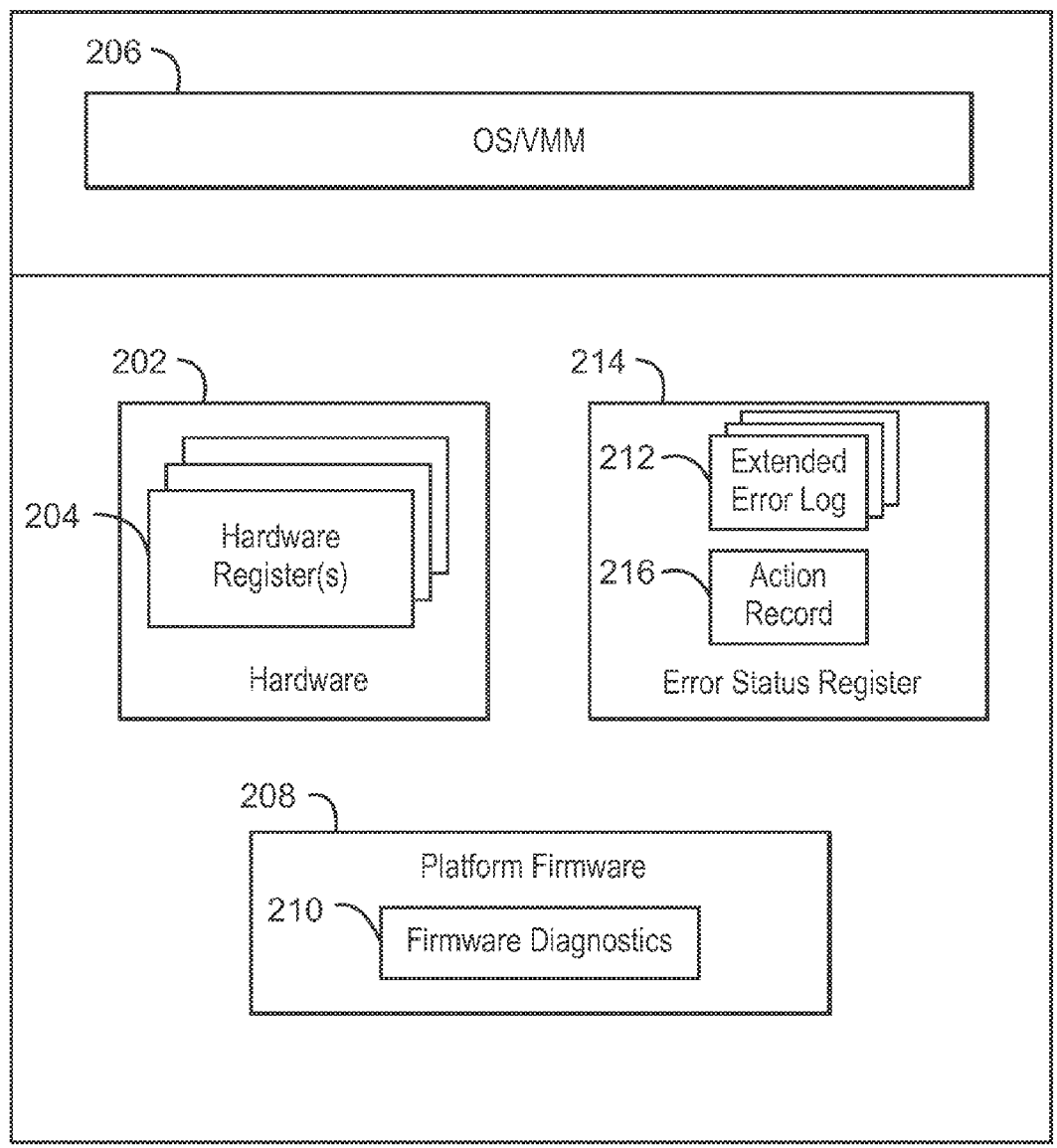
FIG. 2 is a block diagram of another computing system.

FIG. 2 is a block diagram of another computing system 200 for exchanging error information between platform firmware and an operating system. The computing system 200 includes hardware 202. In some cases, the hardware 202 includes the CPU 102 and memory 104, among others. The hardware 202 includes hardware register(s) 204, such as CPU register 118 and memory register 120. Each hardware register 204 is associated with a hardware component of the computing system 200. The computing system 200 further includes an operating system (OS) or Virtual Machine Manager (VMM) 206, depending on the specific implementation of the computing system 200.

The computing system 200 also includes platform firmware 208. The platform firmware 208 can be any type of firmware, such as a basic input/output system (BIOS), among others. The platform firmware 208 includes firmware diagnostics 210. The firmware diagnostics 210 monitors hardware errors and determines when the number of a particular type of hardware errors exceeds a predetermined threshold, i.e., when a particular resource or component displays a bad trend. A bad trend can be, for example, but not limited to, the rate of memory corrected errors within a sampling period, last-level cache (LLC) errors that indicate a bad cache line, etcetera.

The platform firmware 208 is notified when an error log is created. The platform firmware 208 can access the error log to collect error information. The firmware diagnostics 210 can analyze the error information and determine if the OS/VMM 206 is to perform a corrective action. For example, the firmware diagnostics can determine if the number of errors exceeds a predetermined threshold. If the firmware diagnostics 210 determines that no further action is to be taken by the OS/VMM 206, the platform firmware 208 can hide the hardware error from the OS/VMM 206.

If the OS/VMM 206 is to perform a corrective action, the platform firmware 208 can create an extended error log 212. The extended error log 212 can be stored in an error status register 214. The error status register 214 can be accessible by the platform firmware 208 and the OS/VMM 206.

The extended error log includes information regarding the hardware error. The extended error log 212 can also include corrective action to be performed by the OS/VMM 206. For example, the extended error log 212 can include a pointer to an action record 216 that includes the corrective action to be performed by the OS/VMM 206. In another example, the extended error log 212 can include the action record 216.

The action record 216 can include any suitable type of action to be performed by the OS/VMM 206 to address the hardware error. In an example, the action record 216 can instruct the OS/VMM 206 to shut down the affected hardware component until the hardware component is repaired. For example, the corrective action can be for the OS/VMM to stop using some page in memory (also described as 'page offline'). Page offline indicates that a physical address for the specified page be kept off use. Page offline is particularly useful if platform firmware performs corrected error tracking and management. In another example, the corrective action can be 'core offline'. Core offline suggests that the operating system keep the threads associated with a core, offline i.e. avoid scheduling tasks and interrupts on that core or core(s). For example, this could be because the platform firmware determines that the Mid-Level Cache (MLC) in a particular core or one or more execution units in a core are faulty.

The firmware diagnostics 210 can notify the OS/VMM 206 when the extended error log 212 is generated. The firmware diagnostics 210 can use any suitable type of signal, such as an interrupt signal, to notify the OS/VMM 206. When the OS/VMM 206 receives the signal from the firmware diagnostics 210, the OS/VMM 206 accesses the extended error log 212 and the action record 216. After access the action record 216, the OS/VMM 206 performs the corrective action suggested in the action record 216. By notifying the OS/VMM 206 of a hardware error only when the OS/VMM 206 is to perform a corrective error, noise in the computing system can be decreased.

For example, when the platform firmware 208 determines that a physical address of memory has a stuck bit or frequently corrected errors, the platform firmware 208 can instruct the OS/VMM 206 to remove this physical address from the pool of memory in use. In another example, when the platform firmware 208 determines that excessive errors have occurred in a cache unit, such as an MLC or a last level cache (LLC), the platform firmware 208 can instruct the OS/VMM 206 to request removal of associated hardware processing unit to reduce the possibility of an unrecoverable error from occurring.

It is to be understood that the block diagram of FIG. 2 is not intended to indicate that the computing system 200 is to include all of the components shown in FIG. 2 in every case. Further, any number of additional components can be included within the computing system 200, depending on the details of the specific implementation.

Figure 3:
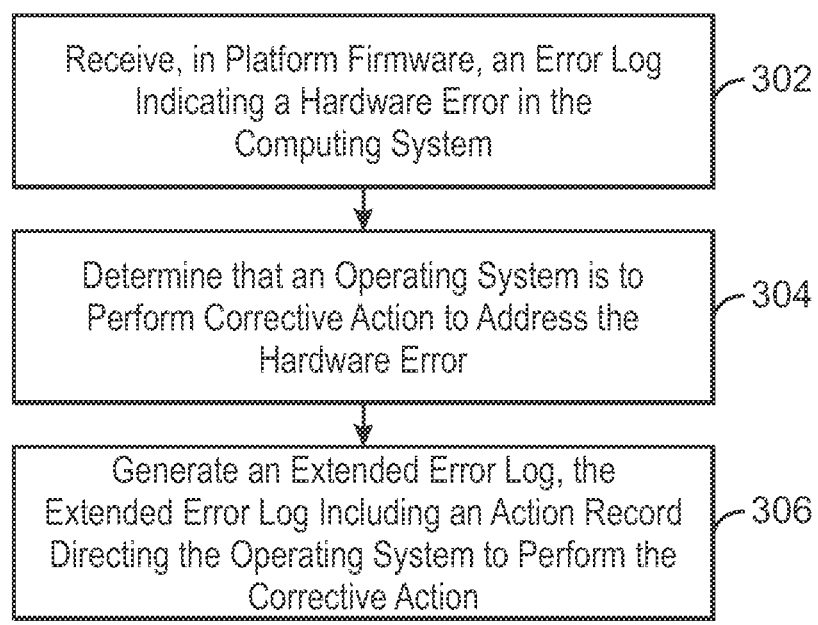
FIG. 3 is a process flow diagram of a method of exchanging error information from platform firmware to the operating system.

FIG. 3 is a process flow diagram of an example of method of exchanging error information from platform firmware to the operating system. At block 302, an error log indicating a hardware error in the computing system can be received in platform firmware. For example, the error log can be for a memory corrected error.

At block 304, the platform firmware can determine that an operating system is to perform corrective action to address the hardware error. For example, the platform firmware can determine that an operating system is to perform corrective action when the number of hardware errors has exceeded a predetermined threshold. In another example, the platform firmware can determine the operating system is to perform corrective action when the number of a particular type of hardware errors has exceeded a predetermined threshold. If the number of hardware errors has not exceeded the predetermined threshold, the platform firmware can hide the hardware error from the operating system.

At block 306, the platform firmware can generate an extended error log. The extended error log can include an action record directing the operating system to perform the corrective action. For example, the extended error log can include a pointer to direct the operating system to the action record. The extended error log and the action record can be stored in a system memory accessible by the platform firmware and the operating system, such as error status register 122.

The action record can include the corrective action and the hardware component to which the corrective action is to be applied. The corrective action can be any type of action that addresses the hardware error. For example, the corrective action can be page offline, which indicates the physical address for the specified length is kept off use. In another example, the corrective action can be core offline, which suggests the operating system keep the threads associated with the affected core from scheduling and interrupts.

It is to be understood the process flow diagram of FIG. 3 is not intended to indicate that the method 300 is to include all of the components shown in FIG. 3 in every case. Further, any number of additional components can be included within the method 300, depending on the details of the specific implementation.

Figure 4:
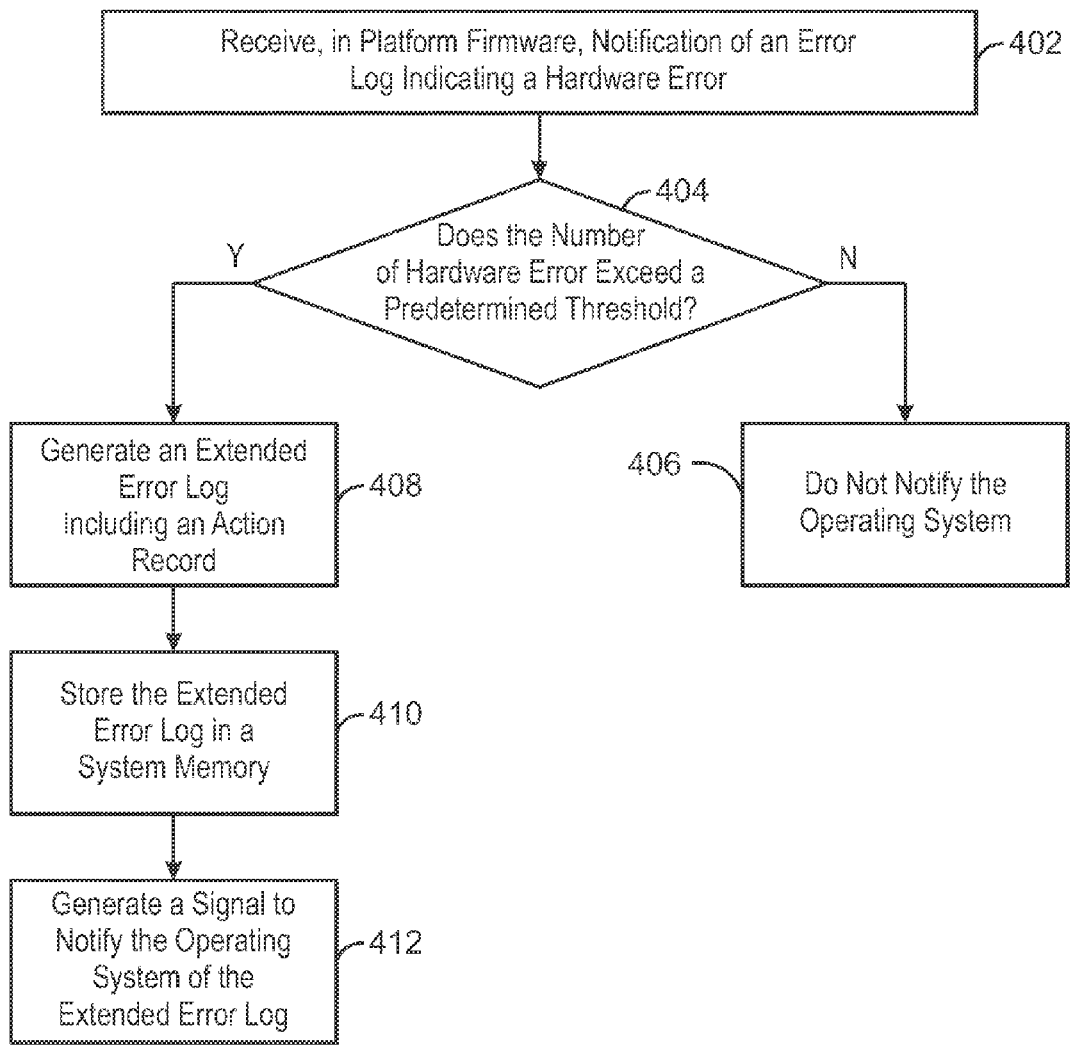
FIG. 4 is a process flow diagram another method of exchanging error information from platform firmware to the operating system.

FIG. 4 is a process flow diagram of an example of another method of exchanging error information from platform firmware to the operating system. At block 402, notification of an error log indicating a hardware error can be received in platform firmware. For example, the error log can be stored in a hardware register associated with the hardware component that experienced the hardware error.

At block 404, the platform firmware can determine if the number of hardware errors exceeds a predetermined threshold. For example, the platform firmware can determine if the number of a particular type of hardware error exceeds a predetermined threshold. If the number of hardware errors does not exceed the predetermined threshold, the platform firmware does not notify the operating system at block 406.

If the number of hardware errors exceeds the predetermined threshold, the platform firmware can generate an extended error log at block 408. The extended error log includes an action record. For example, the extended error log can include a pointer to the action record. The action record informs the operating system of corrective action to take to address the hardware error.

At block 410, the extended error log, including the action record, is stored in system memory, such as error status register 122. The system memory is accessible by the platform firmware and the operating system. At block 412, the platform firmware generates a signal to notify the operating system of the extended error log. The signal can be any suitable type of signal, such as an interrupt signal.

It is to be understood the process flow diagram of FIG. 4 is not intended to indicate that the method 400 is to include all of the components shown in FIG. 4 in every case. Further, any number of additional components can be included within the method 400, depending on the details of the specific implementation.

Example 1

A computing system is described herein. The computing system includes a platform firmware to monitor hardware errors and to notify an operating system when a corrective action is to be performed to address a hardware error. The computing system also includes an extended error log to describe a hardware error. Further, the computing system includes an action record to direct the operating system to perform the corrective action to address the hardware error.

The extended error log can include the action record. The extended error log can include a pointer to direct the operating system to the action record. The extended error log can be stored in system memory, the system memory accessible by the platform firmware and the operating system. The action record can be stored in system memory, the system memory accessible by the platform firmware and the operating system. The platform firmware can monitor hardware errors and notify the operating system when a number of hardware errors exceeds a predetermined threshold. The platform firmware can initiate an interrupt signal to notify the operating system of the hardware error. The action record can include a component to be addressed and the corrective action to be performed by the operating system.

Example 2

A computing system is described herein. The computing system includes logic to receive, in platform firmware, an error log indicating a hardware error in the computing system. The computing system also includes logic to determine that an operating system is to perform corrective action to address the hardware error. The computing system further includes logic to generate an extended error log, the extended error log including an action record directing the operating system to perform the corrective action.

The extended error log can include a pointer directing the operating system to the action record. Determining the operating system can be to perform corrective action including determining that a number of hardware errors has exceeded a predetermined threshold. The extended error log can be stored in a system memory, the system memory accessible by the platform firmware and the operating system. The action record can be stored in a system memory, the system memory accessible by the platform firmware and the operating system. The action record can include the corrective action to be performed by the operating system and a hardware component on which the corrective action is to be performed. The computing system can further include logic to generate an interrupt signal to notify the operating system to access the extended error log.

Example 3

A computing system is described herein. The computing system includes a platform firmware to generate an extended error log to notify an operating system of a hardware error in the computing system and to advise the operating system of a corrective action to take to address the hardware error.

The extended error log can include an action record to advise the operating system of the corrective action to take to address the hardware error. The extended error log can include a pointer to direct the operating system to the action record. The extended error log can be stored in a system memory accessible by the platform firmware and the operating system. The action record can be stored in a system memory accessible by the platform firmware and the operating system. The action record can include the corrective action and on which hardware component the corrective action is to be taken. The platform firmware can notify the operating system when a number of hardware error exceeds a predetermined threshold.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing system, comprising:
   a hardware processor to execute a platform firmware to monitor hardware errors and to notify an operating system when a corrective action is to be performed to address a hardware error;
   an extended error log to describe the hardware error; and
   an action record to direct the operating system to perform the corrective action to address the hardware error, wherein the extended error log comprises a pointer to direct the operating system to the action record.

2. The computing system of claim 1, wherein the extended error log comprises the action record.

3. The computing system of claim 1, wherein the extended error log is stored in system memory, the system memory accessible by the platform firmware and the operating system.

4. The computing system of claim 1, wherein the action record is stored in system memory, the system memory accessible by the platform firmware and the operating system.

5. The computing system of claim 1, wherein the platform firmware monitors hardware errors and notifies the operating system when a number of hardware errors exceeds a predetermined threshold.

6. The computing system of claim 5, wherein the platform firmware initiates an interrupt signal to notify the operating system of the hardware error.

7. The computing system of claim 1, wherein the action record comprises a component to be addressed and the corrective action to be performed by the operating system.

8. A computing system, comprising:
   hardware logic to receive, in platform firmware, an error log indicating a hardware error in the computing system;
   logic to determine that an operating system is to perform corrective action to address the hardware error; and
   logic to generate an extended error log, the extended error log comprising an action record directing the operating system to perform the corrective action, wherein the extended error log comprises a pointer directing the operating system to the action record.

9. The computing system of claim 8, wherein determining the operating system is to perform corrective action comprises determining that a number of hardware errors has exceeded a predetermined threshold.

10. The computing system of claim 8, wherein the extended error log is stored in a system memory, the system memory accessible by the platform firmware and the operating system.

11. The computing system of claim 8, wherein the action record is stored in a system memory, the system memory accessible by the platform firmware and the operating system.

12. The computing system claim 8, wherein the action record comprises the corrective action to be performed by the operating system and a hardware component on which the corrective action is to be performed.

13. The computing system of claim 8, further comprising logic to generate an interrupt signal to notify the operating system to access the extended error log.

14. A computing system, comprising:
   a hardware processor to execute a platform firmware to generate an extended error log to notify an operating system of a hardware error in the computing system and to advise the operating system of a corrective action to take to address the hardware error, wherein the extended error log comprises a pointer to direct the operating system to the action record.

15. The computing system of claim 14, wherein the extended error log comprises an action record to advise the operating system of the corrective action to take to address the hardware error.

16. The computing system of claim 15, wherein the action record is stored in a system memory accessible by the platform firmware and the operating system.

17. The computing system of claim 15, wherein the action record comprises the corrective action and on which hardware component the corrective action is to be taken.

18. The computing system of claim 14, wherein the extended error log is stored in a system memory accessible by the platform firmware and the operating system.

19. The computing system of claim 14, wherein the platform firmware notifies the operating system when a number of hardware errors exceeds a predetermined threshold.

* * * * *